United States Patent [19]

Stemme et al.

[11] 4,251,148
[45] Feb. 17, 1981

[54] PHOTOGRAPHIC CAMERA

[75] Inventors: Otto Stemme, Munich; Dieter Engelsmann, Unterhaching; Reinhard Nicko, Munich, all of Fed. Rep. of Germany

[73] Assignee: AGFA-Gevaert, A.G., Leverkusen, Fed. Rep. of Germany

[21] Appl. No.: 104,901

[22] Filed: Dec. 18, 1979

[30] Foreign Application Priority Data

Dec. 21, 1978 [DE] Fed. Rep. of Germany ....... 2855312

[51] Int. Cl.³ .............................................. G03B 1/12
[52] U.S. Cl. ..................................... 354/173; 354/214
[58] Field of Search .............................. 354/170–173, 354/214, 218; 242/71.5; 352/124

[56] References Cited

U.S. PATENT DOCUMENTS 2,674,931  4/1954  Mihalyi ................................. 354/218
3,126,803  3/1964  Hintze ................................... 354/173

Primary Examiner—John Gonzales
Attorney, Agent, or Firm—Michael J. Striker

[57] ABSTRACT

A photographic camera has a housing provided with a film loading chamber, a film storage chamber and a film window. An arrangement is provided for transporting unexposed film from the loading chamber to the storage chamber and for subsequently transporting it intermittently past the film window for exposure and back into the loading chamber. This arrangement includes a direction-reversible film transporting motor, an operating member which causes the motor to rotate in one direction in which film is transported from the loading chamber into the storage chamber, and a camera actuating member which causes the motor to rotate in an opposite direction in which the film is intermittently transported from the storage chamber past the film window into the loading chamber.

21 Claims, 3 Drawing Figures

PHOTOGRAPHIC CAMERA

This invention relates to a photographic camera in general.

More particularly, the invention relates to a photographic camera of the type having a film loading chamber where film is loaded into the camera and a film storage chamber into which the non-exposed film is first transported from the loading chamber, and from which it is subsequently returned in steps corresponding to the length of the film frames back into the loading chamber.

In cameras of the type in which the film is loaded on a spool or cartridge from which it is withdrawn to be taken up on a spool in the camera, it is necessary after the film has been fully exposed to rewind the film onto its loading spool or into its loading cartridge before the camera can be opened and the film withdrawn. Since this is somewhat time consuming, a proposal has been made in U.S. Pat. No. 2,674,931 to provide a camera having a loading chamber into which the film cartridge is inserted, and a storage chamber into which the non-exposed film is transported from the cartridge after the camera is closed, to be returned incrementally into the cartridge past the film window as exposures are being made. With this arrangement, therefore, the film is back in the cartridge (but now in exposed condition) as soon as all exposures have been made and the camera can be immediately opened and the film cartridge removed without danger of light doing damage to the pictures. However, the transportation of the film from the cartridge into the storage chamber of the camera is somewhat complicated and this tends to negate the time gained by not having to rewind the film at the completion of the exposures.

It is also known in the prior art to have cameras where the film is transported by an electric motor, and in which the film is taken up on a spool permanently installed in the camera and, after all exposures have been taken, is automatically returned into the cartridge by reversal of the direction of the electric motor. In terms of the time saved and the ease of operation, this approach is quite satisfactory. However, cameras of this type are relatively complicated and require use of slip couplings between the film transport drive and the film spools. Since slip couplings require relatively high forces to cause slip at the appropriate time, it is necessary to install relatively large electric motors and relatively powerful batteries, which increases the overall dimensions of the camera and makes the camera more expensive. In addition, the use of switches to control the direction reversal of the motor and the shut-down of the motor at the end of the operation, further increases the expense of such cameras.

SUMMARY OF THE INVENTION

It is, accordingly, an object of the present invention to avoid the disadvantages of the prior art.

More particularly, it is an object of the present invention to provide an improved photographic camera which avoids the aforementioned drawbacks.

Still more specifically, it is an object of this invention to provide a photographic camera in which the transportation of the non-exposed film from the loading chamber into the storage chamber of the camera is simplified and speeded up, and in which the slip couplings and direction-reversing and shut-down switches of the prior art motor cameras can be avoided.

In keeping with these objects, and others which will become apparent hereafter, one aspcet of the invention resides in a photographic camera which, briefly stated, may comprise a housing having a film window. Means are provided for transporting unexposed film from the loading chamber to the storage chamber and for subsequently transporting the film intermittently past the film window for exposure and back into the loading chamber. Such means may comprise a direction-reversible film-transport motor which may be electric, an operating member for causing the motor to rotate in one direction in which film is transported from the loading chamber into the storage chamber, and a camera actuating member for causing the motor to rotate in an opposite direction in which the film is incrementally transported from the storage chamber past the film window into the loading chamber.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
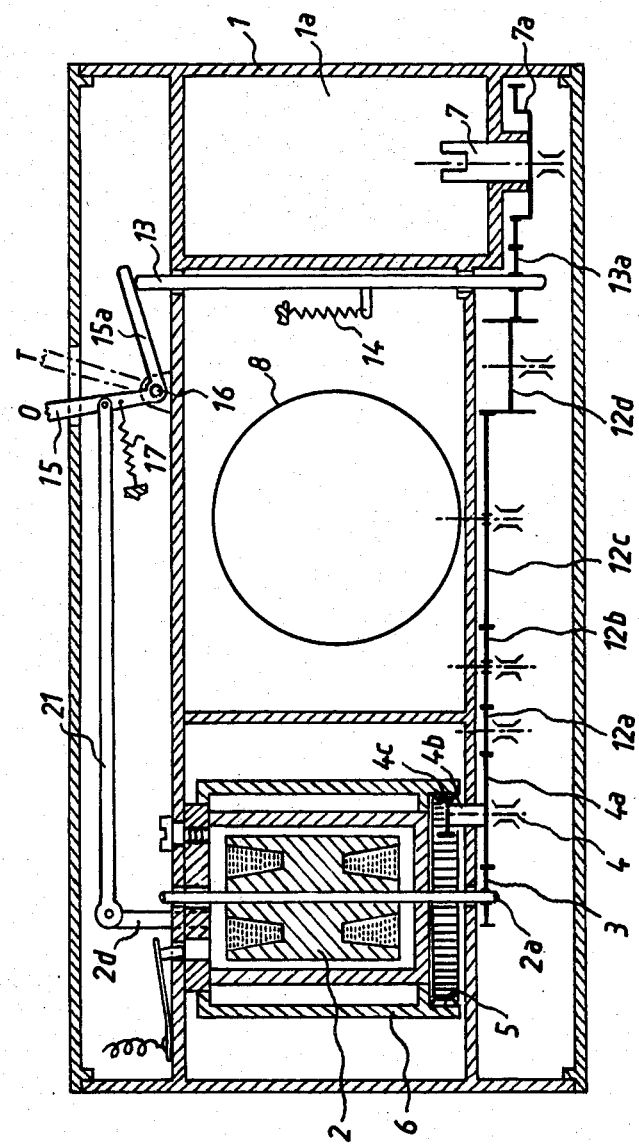
FIG. 1 is a partly sectioned view of a camera embodying the present invention, as seen in the direction normal to the plane of the film.
Figure 2:
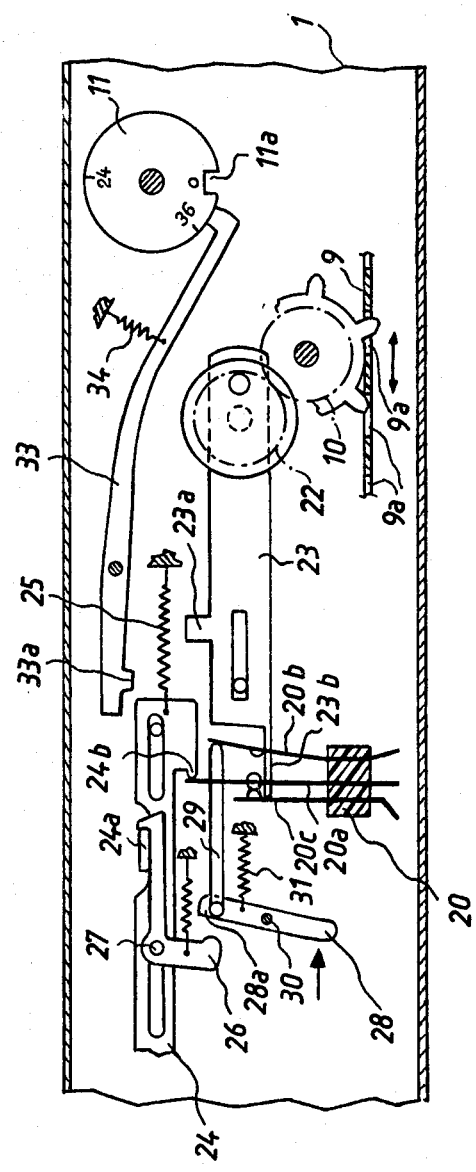
FIG. 2 is a fragmentary plan view of the camera shown in FIG. 1, broken-away in part and seen in direction parallel to the plane of the film.
Figure 3:
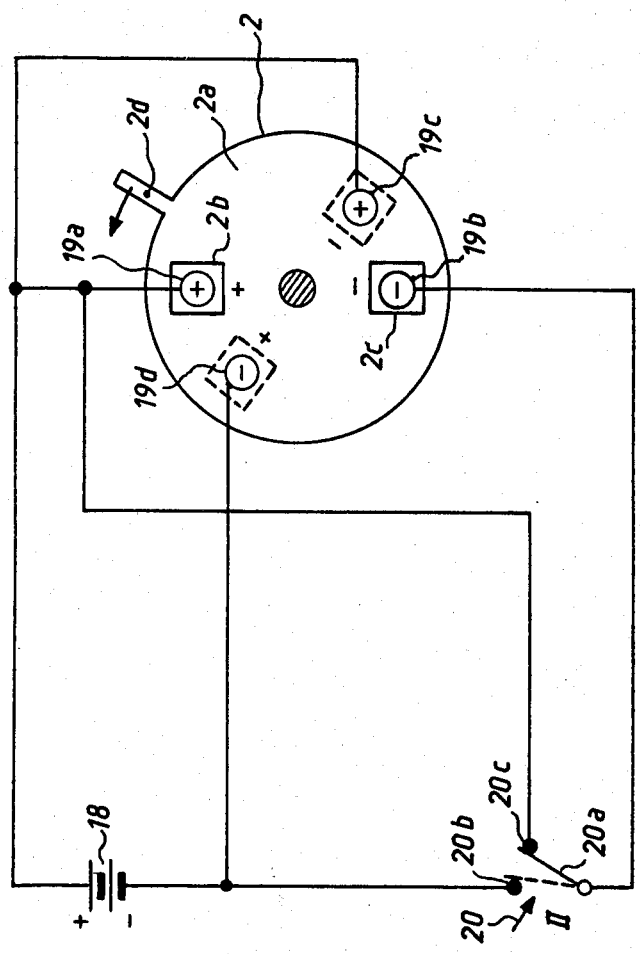
FIG. 3 is a circuit diagram for the electric motor of the embodiment in FIGS. 1 and 2.

Referring now to the drawing which shows an exemplary embodiment of the invention in FIGS. 1-3, it will be seen that reference numeral 1 identifies the camera housing. A direction-reversible electric motor is identified in reference numeral 2 and has a rotary shaft 2a carrying a pinion 3. A gear 4a meshes with the pinion 3 and is mounted on a shaft 4. Gear 4a is connected with a film transporting gear 4c via a coupling 4b which is effective only in the take-up direction of the film take-up spool 6 which is located in the film storage chamber of the camera. The camera also has a film loading chamber 1a into which fresh film is loaded which may be on a spool or in a cartridge (e.g. roll of film) with a projection of the spool or cartridge engaging in a recess of the turnable member 7 which extends in part into the film loading chamber 1a.

The previously mentioned film transporting gear 4c meshes with internal teeth 5 of the film spool 6. When the motor 2, which is co-axially mounted in the spool 4c turns the spool 6 via the teeth 5 in clockwise direction, so that the film 9 (not shown in FIG. 1 but visible in FIG. 2) is thereby withdrawn from the spool or cartridge in the film loading chamber 1a and taken up on the spool 6. FIG. 2 shows a star wheel 10 which engages in the film perforations 9a and serves exclusively for film metering purposes. The transmission between wheel 10 and a film counter 11 is not illustrated, because any transmission known per se from roll film cameras, particularly 35 millimeter cameras, can be used for this purpose. Also illustrated in FIG. 1 is the lens 8, but only diagrammatically, it being understood that the camera will have a film window which is in register with the lens 8 and past which the film must move incrementally to enable the user to make successive exposures.

The aforementioned gear 4a forms a gear train with the gears 12a, 12b, 12c, and 12d and the shaft 7 is connected with the gear 7a. An intermediate gear 13a is mounted on a shiftable shaft 13 between the gears 12d and against an arm 15a of an operating member 15 which is turnable about an axis 16. The operating member 15 in turn is under the influence of a spring 17 which permanently tends to pull the arm 15 upwardly in counter-clockwise direction. In the 0 position, in which the member 15 is in its rest position, the gear 13a is in mesh with the gears 12d and 7a. The gears 3, 4a, 12a–12d, 13a and 7a are so dimensioned that when the motor 2 turns in clockwise direction the shaft 7 turns in opposite direction, i.e. in counter-clockwise direction so that the shaft 7 causes film to be taken up onto the spool or cartridge (not shown) located in the loading chamber 1a. Thus, take-up of the film 9 on whatever element is located in the loading chamber 1a is effected by reversing the polarity of the reversible electric motor 2.

This reversal of the electric motor 2 is obtained in a simple manner, according to the invention, by connecting to the motor 2 a rotary switch 2a having a positive pole 2b and a negative pole 2c which are offset relative to one another by 180°, and a pivot arm 2d. These, together with the motor 2, are adjustable relative to two positive contacts 19a and 19c connected to the positive pole of the battery 18, and two negative contacts 19b and 19d connected to the negative pole of the battery 18. FIG. 3 shows that the negative pole 2c of the motor 2 is connected with the negative contact 19b whereas the positive contact 19a. A shorting circuit is located between the contacts 19a and 19b. A reversing switch 20 is movable between two positions, namely the position 1 in which it shorts the motor 2 to effect a rapid termination of film transportation, and a position 2 in which it connects the motor 2 to the battery 19 so that the motor 2 will rotate in a clockwise direction to turn the shaft 7 which takes up film on the spool on the element located in the chamber 1a. If the motor 2 is turned on arm 2d in counter-clockwise direction, then the positive pole 2b of the motor 2 is connected with the negative contact 19d and the negative pole of the motor 2c is connected to the positive contact 19c, so that the motor 2 now rotates in a counter-clockwise direction and causes film to be taken up from the chamber 1a onto the spool 6 in the film storage chamber.

In operation of the camera, the non-exposed fresh film 9 is inserted into the film loading chamber 1a by inserting a film spool, film cartridge or the like into that chamber, whereupon a free end of the film is connected manually to the spool 6 in the manner known per se. Thereafter, the camera is closed and the motor 2 is operated so that the entire length of film is withdrawn from the chamber 1a and taken up onto the spool 6 in the film storage chamber. The exposure of individual film frames is carried out only when the film is thereupon returned step wise from the spool 9 into the chamber 1a.

To effect the motorized transportation of the non-exposed film 9 from the chamber 1a onto the spool 6 the member 15 is used which is coupled with the pivoting arm 2d of the motor 2 via a link 21. When the arm 15 is pivoted in clockwise direction to the position T, the gear 13a and its shaft 13 are shifted downwardly out of mesh with the gears 12d and 7a. The shaft 7 and the film spool or cartridge located in the chamber 1a are now freely turnable. The link 21 turns the motor 2 in counter-clockwise direction (compare FIGS. 1 and 3) so that its positive pole 2b becomes connected with the negative contact 19b and its negative pole 2c with the positive contact 19c, causing the motor 2 to turn in counter-clockwise direction and to take up the film 9 (the leading end of which is connected to the spool 6) onto the spool 6 until either the member 15 is released by the fingers of the user or the film end which is secured to the spool or cartridge in the chamber 1a, prevents further film advancement. During this movement the star or perforation wheel 10 turns in clockwise direction and a crank rod 23 privoted to a gear 22 coupled with the wheel 10 performs a one-time movement during which it causes the non-illustrated camera shutter (known per se) to be cocked, whereupon it just performs idling movements. The counter 11 counts the number of film frames which have been taken up onto the spool 6 but which are not being exposed at this time. When the film has been completely taken up on the spool 6, the member 15 is released and is biased back to its starting position of FIG. 1 biased by springs 17, 14, so that the gear 13a moves back into mesh with the gears 12d and 7a, whereas the motor 2 moves back to the position in which its positive pole 2b engages the positive contact 19a and its negative pole 2c engages the negative contact 19b. Thus, when the switch 20 is operated the motor will now turn in clockwise direction.

In this, the normal position, the rotation of the motor 2 causes the shaft 7 to be turned in a sense in which the film is withdrawn from the spool 6 and taken back up on the spool or cartridge located in the loading chamber 1a; i.e. the shaft 7 is being turned in counter-clockwise direction. During this movement the wheel 10 turns correspondingly in clockwise direction whereas the counter 11 now counts backwards with each exposure that is being made.

A slide member serving to cock the shutter is identified with reference numeral 24 and is located in the path of movement of a projection 23a of the crank rod 23. A spring 25 engages the member 24 and the latter has a projection 24a in the path of movement of which (in the cocked condition of the shutter) there is located a release lever 26 that is turnable about an axis 27. A projection 24b cooperates with the switching contact 20a of the switch 20. In addition, the end of a slide 29 pivoted to a camera actuating member 28, acts upon the contact 20b of the switch 20. The member 28 is constructed as a double-armed lever which is turnable about an axis 30 and is biased by a restoring spring 31. At one end 28a of the member 28 the slide 29 is pivoted and in the path of movement of this end of 28 a lever arm of the release member 26 is located.

The camera is shown in FIG. 2 in the position which it assumes after the film transport is completed. The slide 24 has been tentioned by the projection 23a and snapped behind the lever 26. The switch 20 is in the position 1 for shorting the motor 2. If, now the slide 24 is released via the members 28 and 26, then the switch 20 will—after the shutter has operated and due to the disengagement of the contact 20a by the projection 24b and of the contact 20b by the members 29 and 26—the switch will move to the position 2 so that the film 9 is now transported until the wheel 10 returns the switch 20 to position 1 after the shutter has been again cocked and the counter 11 has been advanced by one step. The reversal of switch 20 after a completed rotation of the wheel 10, i.e. back to the shorting position 1, is effected via a rank rod 23, or more specifically a projection 23b thereof, which is indirectly connected with the wheel 10. The projection 23 is so long that it releases the contact 20c to permit an engagement of the contact 20a which has been pre-tensioned by the projection 24b, only after the shutter cocking position shown in FIG. 2 has been reached. This means that after half a rotation of the wheel 10 shifting of the slide member 24 to the position shown in FIG. 2 causes the shutter to be cocked, but under the influence of the projection 23b the switch 20 remains in the position 2 when the release 30 is operated, with the contacts 20a and 20b in engagement with one another; this remains until an completed revolution of the wheel 10 the contacts 20a and 20c come in engagement and the motor 2 is thereby shorted and stops substantially instantaneously. In this manner the camera release, i.e. the release of the shutter and the motorized film transport follow one another until even the last film frame on the film that it was taken up on the spool 6, i.e. that film frame which was the first one to be taken up on the spool 6, has been exposed and returned to the chamber 1a.

When the last exposure has been made and the film segment carrying the last exposure is taken up in the chamber 1a, the film counter 11 has reached its position 0. At this time a blocking member 28 can engage in a recess 11a of the counter 11 under the biasing action of a spring 34. At the same time a portion 33a moves in front of the tensioned slider 24 so that the same can not shift positions. Since the counter 11 starts to move as soon as the motorized take-up of the film 9 on the spool 6 begins, i.e. as soon as the withdrawal of non-exposed film from the chamber 1a is commenced, the return of the film counter to the 0 position indicates that the now exposed film has been completely returned to the film spool respectively film cartridge located in the loading chamber 1a. In a manner known per se the member 33 can be lifted out of the recess 11a when the camera back is moved to open position (camera back is not shown and a very weak spring can be utilized to impart to the film counter 11 a very slight turning movement until it engages a not illustrated abutment, so that the member 33 can drop back into the recess 11a only when the next film has first been taken up on the spool 6 and thereupon been completely returned into the chamber 1a. However, it would of course also be possible to move the member 33 out of engagement with the recess 11a, either directly or indirectly, after a new cartridge is inserted into the chamber 1a, for example by movement of the member 15 to the position T.

It will be appreciated that the camera according to the present invention has several advantages along the lines set forth in the introductory portion of this description. For example, despite the use of a small cartridge, e.g. a 35 millimeter film cartridge, the film does not need to be wound back in the camera but is back in the cartridge as soon as the permissable number of exposures has been completed, so that immediately thereafter the cartridge can be removed from the camera. In addition, the take up of the complete non-exposed film onto the spool 6, and the use of the wheel 10 exclusively for film metering purposes, allows the elimination of the herebefore described slip coupling between the motor drive and the equivalent of the film spool 6, and this in turn permits the use of a smaller motor and smaller batteries, reducing the camera size and reducing the energy requirements. Moreover, the end switching arrangement herebefore required for a 35 millimeter camera with electric film transport, i.e. the arrangement which was needed for switching off the motor or for switching it from forward to reverse movement so as to return the film back into the film cartridge, is eliminated in the camera according to the present invention.

It goes without saying that there is a variety of modifications which can be made in the illustrated embodiment without departing from the intent and concept of the new invention. For example, the spool 6 could be omitted and instead the film could be loosely stored in an appropriately configurated storage chamber of the camera. Of course, in this case it would be necessary for the motor to drive the wheel 10 rather than the spool 6 and it might be necessary to provide a slip coupling between the gears 7a and the shaft 7. However, since the slip coupling would be disengage during transportation of the film from the chamber 1a into the film storage chamber, this would still represent a net gain over what is known from the prior art since no forces would be needed to overcome the slip coupling during the film transportation from the chamber 1a into the film storage chamber.

It will be understood that each of the elements described above, or two or more together, may also find a useful application in other types, e.g. 35 mm Cameras differing from the types described above.

While the invention has been illustrated and described as embodied in a "Photographic Camera," it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. In a photographic camera, a combination comprising a housing having a film loading chamber, a film storage chamber and a film window; and means for transporting unexposed film from said loading chamber to said storage chamber, and for subsequently transporting it intermittently past said film window for exposure and back into said loading chamber, said means comprising a direction-reversible film-transport motor, an operating member for causing the motor to rotate in one direction in which film is transported from said loading chamber into said storage chamber, and a camera actuating member for causing the motor to rotate in an opposite direction in which the film is intermittently transported from said storage chamber past said film window into said loading chamber.

2. A combination as defined in claim 1, wherein said motor is an electric motor.

3. A combination as defined in claim 1, and further comprising a film take-up and pay-out spool in said storage chamber.

4. A combination as defined in claim 1, further comprising a film take-up and pay-out spool in said storage chamber, said motor being an electric motor mounted within the confines of said spool co-axially thereto; and a transmission operable by said motor for driving said spool in a direction in which it takes up film from said loading chamber.

5. A combination as defined in claim 1, further comprising rotatable means operatively associated with said loading chamber for causing film to be taken up as paid out in said loading chamber; transmission means for causing said rotatable means to turn in a sense causing film to be taken up in said loading chamber; and means operated by said operating member for disengaging said rotatable means from said transmission means when said motor is caused to rotate in said one direction.

6. A combination as defined in claim 1, further comprising a film frame counter; and means responsive to film transportation and operative for advancing said film frame counter stepwise in forward direction during transportation of the film into said storage chamber and subsequently in reverse direction during transportation of the film into said loading chamber.

7. A combination as defined in claim 6, wherein said advancing means comprises a star wheel engageable in perforations of the film.

8. A combination as defined in claim 1, said motor being an electric motor and including an electric switch for selecting the direction of rotation of the motor, said operating member being operable to set the electric switch to a position in which the motor rotates in said one direction.

9. A combination as defined in claim 8, said electric switch being a rotary switch; and further comprising a motion transmitting link coupling said switch with said operating member.

10. A combination as defined in claim 9, said switch being arranged coaxially to said motor and being connected thereto without freedom of relative rotation.

11. A combination as defined in claim 1, said operating member being movable between a rest position and an operating position; and further comprising means permanently tending to bias said operating member to said rest position thereof.

12. A combination as defined in claim 1, further comprising a film frame counter; means responsive to film transportation and operative for advancing said film frame counter stepwise in one direction during transportation of the film into said storage chamber and subsequently in opposite direction during transportation of the film into said loading chamber; said motor being an electric motor; means for intermittently short-circuiting said electric motor; and means coupling said advancing means with said short-circuiting means to intermittently energize and thereupon short-circuit said electric motor during incremental transportation of the film into said loading chamber.

13. A combination as defined in claim 12, said short-circuiting means comprising a crank-rod, a slide member movable by said crank-rod, and electrical contact means in the path of movement of said slide member.

14. A combination as defined in claim 13, said slide member including a projection, and said contact means comprising two outer contacts and a center contact located between said outer contacts and movable by engagement with said projection, one of said outer contacts being movable by said camera activating member.

15. A combination as defined in claim 14, said camera activating member comprising a slide engageable with said one outer contact.

16. A combination as defined in claim 15, said slide member and said slides being movable in mutually opposite directions an operation of said camera actuating member, so as to release said one outer contact and said center contact for movement thereof towards each other.

17. A combination as defined in claim 16, said crank-rod having a projection which engages said one outer contact and maintains the same out of engagement with said center contact until said crank-rod moves to a starting position corresponding to an incremental film advance.

18. A combination as defined in claim 13, said advancing means comprising a film-perforation engaging star wheel having a portion engageable with a blocking element for moving the same to a blocking position in which it blocks movement of said crank rod.

19. A combination as defined in claim 18, and further comprising means for moving said blocking element to an unblocking position.

20. A combination as defined in claim 1, further comprising a film frame counter; and means responsive to film transportation and operative for advancing said film frame counter stepwise in reverse direction during transportation of the film into said storage chamber and subsequently in forward direction during transportation of the film into said loading chamber; and means coupling said motor with said advancing means when said motor rotates in said other direction, so that said advancing means transports said film into said loading chamber.

21. A combination as defined in claim 1, further comprising a film frame counter; and means responsive to film transportation and operative for advancing said film frame counter stepwise in reverse direction during transportation of the film into said storage chamber and subsequently in forward direction during transportation of the film into said loading chamber; and means coupling said motor with said advancing means when said motor rotates in said one direction, so that said advancing means transports said film into said storage chamber.

* * * * *